(12) United States Patent
Delmas et al.

(10) Patent No.: US 11,198,604 B2
(45) Date of Patent: Dec. 14, 2021

(54) LIQUID LITHIUM SUPPLY AND REGULATION

(71) Applicant: Applied Materials, Inc., Santa Clara, CA (US)

(72) Inventors: Jean Delmas, Santa Clara, CA (US); Bernard Frey, Livermore, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 187 days.

(21) Appl. No.: 16/445,327

(22) Filed: Jun. 19, 2019

(65) Prior Publication Data

US 2020/0002153 A1 Jan. 2, 2020

Related U.S. Application Data

(60) Provisional application No. 62/692,225, filed on Jun. 29, 2018.

(51) Int. Cl.
*B67D 7/02* (2010.01)
*B67D 7/16* (2010.01)
(Continued)

(52) U.S. Cl.
CPC .............. *B67D 7/02* (2013.01); *B65D 88/748* (2013.01); *B67D 7/16* (2013.01); *B67D 7/32* (2013.01);
(Continued)

(58) Field of Classification Search
CPC .......... B65D 88/748; B67D 7/02; B67D 7/16; B67D 7/32; B67D 7/3272; B67D 7/36;
(Continued)

(56) References Cited

U.S. PATENT DOCUMENTS

| 4,645,959 A | 2/1987 | Dobran |
|---|---|---|
| 5,415,529 A | 5/1995 | Le Boucher et al. |

(Continued)

FOREIGN PATENT DOCUMENTS

| EP | 0232661 A1 | 8/1987 |
|---|---|---|
| EP | 0392910 A1 | 10/1990 |
| WO | 2004-113907 A2 | 12/2004 |

OTHER PUBLICATIONS

International Search Report and Written Opinion for International Application No. PCT/US2019/037858 dated Oct. 2, 2019.

*Primary Examiner* — Jessee R Roe
*Assistant Examiner* — Michael Aboagye
(74) *Attorney, Agent, or Firm* — Patterson + Sheridan, LLP (57) ABSTRACT

Methods and systems for the production and delivery of lithium metal of high purity are provided. More particularly, methods and systems for lithium metal purification, delivery and deposition are provided. In at least one aspect, a liquid lithium delivery system is provided. The liquid lithium delivery system comprises a liquid lithium delivery module. The liquid lithium delivery system comprises a lithium storage region operable to store the liquid lithium, a pumping region operable to move liquid lithium through the lithium delivery, and a flow control region. The pumping region comprises an electromagnetic pump operable to move the liquid lithium using electromagnetism. The flow control region operable to control the flow of liquid lithium, comprising one or more valves operable to control the flow of the liquid lithium, wherein the pumping region is positioned downstream from the lithium storage region and upstream from the flow control region.

20 Claims, 3 Drawing Sheets

(51) Int. Cl.
*B67D 7/32* (2010.01)
*B67D 7/62* (2010.01)
*B67D 7/76* (2010.01)
*B67D 7/78* (2010.01)
*B67D 7/82* (2010.01)
*B65D 88/74* (2006.01)
*B67D 7/36* (2010.01)
*H05B 1/02* (2006.01)

(52) U.S. Cl.
CPC .............. *B67D 7/3272* (2013.01); *B67D 7/36* (2013.01); *B67D 7/62* (2013.01); *B67D 7/76* (2013.01); *B67D 7/78* (2013.01); *B67D 7/82* (2013.01); *H05B 1/0297* (2013.01)

(58) Field of Classification Search
CPC ... B67D 7/62; B67D 7/76; B67D 7/78; B67D 7/82; C22B 26/12; C22B 9/023; H05B 1/0247; H05B 1/0297
USPC ....... 222/593, 590; 137/14, 487.5, 208, 255, 137/262
See application file for complete search history.

(56) References Cited

U.S. PATENT DOCUMENTS

| | | | |
|---|---|---|---|
| 5,607,000 A | * | 3/1997 | Cripe .................. B67D 7/0272 137/205 |
| 5,609,191 A | * | 3/1997 | Topping ................ B67D 7/002 137/565.17 |
| 5,989,317 A | * | 11/1999 | Huang ............... B01D 19/0068 95/241 |
| 6,267,132 B1 | | 7/2001 | Guarneri |
| 6,878,216 B2 | * | 4/2005 | Fujishima ......... H01L 21/67248 134/26 |
| 2003/0079480 A1 | | 5/2003 | Emmer et al. |
| 2005/0173458 A1 | * | 8/2005 | Hiranaga ................. B67D 7/76 222/263 |
| 2006/0054219 A1 | | 3/2006 | Sund et al. |
| 2008/0063547 A1 | * | 3/2008 | Priem .................... F04B 53/20 417/423.9 |
| 2013/0322587 A1 | | 12/2013 | Miura et al. |
| 2015/0069680 A1 | | 3/2015 | Kuri et al. |

* cited by examiner

LIQUID LITHIUM SUPPLY AND REGULATION

CROSS-REFERENCE TO RELATED APPLICATIONS

This application claims benefit of U.S. provisional patent application Ser. No. 62/692,225, filed Jun. 29, 2018, which is incorporated herein by reference in its entirety.

BACKGROUND

Field

Implementations described herein generally relate to methods and systems for the production and delivery of lithium metal of high purity. More particularly, the implementations described herein relate to methods and systems for lithium metal purification, delivery and deposition.

Description of the Related Art

Printed electronics are increasing in importance as societal demand for flexible devices and various IoT (internet of things) applications increases. For example, printing of circuits on flexible substrates can help in packaging of sensors. Rechargeable electrochemical devices are also becoming increasingly essential for many fields of everyday life. High-capacity energy storage devices, such as supercapacitors and lithium metal containing batteries, are also used in a growing number of applications, including portable electronics, medical, transportation, grid-connected large energy storage, renewable energy storage, and uninterruptible power supply (UPS). However, despite the increased demand for lithium metal, lithium metal faces several device integration challenges.

Lithium is an alkali metal. Like the heavy element homologs of the first main group, lithium is characterized by a strong reactivity with a variety of substances. Lithium reacts violently with water, alcohols and other substances that contain protic hydrogen, often resulting in ignition. Additionally, lithium is unstable in air and reacts with oxygen, nitrogen and carbon dioxide. Normally, lithium is handled under an inert gas atmosphere (noble gases such as argon) and the strong reactivity of lithium necessitates that other processing operations also be performed in an inert gas atmosphere. Pure liquid lithium is difficult to obtain because of the strong reactivity of lithium. A "skin" tends to form on the liquid lithium when the liquid lithium reacts with contaminants in the atmosphere. This skin prevents proper flowing of the liquid lithium and tends to clog the lithium delivery system. As a result, lithium provides several challenges when it comes to delivery, processing, storage, and transportation.

Therefore, there is a need for methods and systems for the delivery and deposition of lithium metal of high purity.

SUMMARY

Implementations described herein generally relate to method and systems for the production and delivery of lithium metal of high purity. More particularly, the implementations described herein relate to methods and systems for lithium metal purification, delivery and deposition. In at least one aspect, a liquid lithium delivery system is provided. The liquid lithium delivery system comprises a liquid lithium delivery module. The liquid lithium delivery system comprises a lithium storage region operable to store the liquid lithium, a pumping region operable to move liquid lithium through the lithium delivery, and a flow control region. The pumping region comprises an electromagnetic pump operable to move the liquid lithium using electromagnetism. The flow control region operable to control the flow of liquid lithium comprises one or more valves operable to control the flow of the liquid lithium, wherein the pumping region is positioned downstream from the lithium storage region and upstream from the flow control region.

In at least one aspect, a liquid lithium delivery system is provided. The liquid lithium delivery system comprises a liquid lithium delivery module and a liquid lithium resupply module detachably and fluidly coupled with the liquid lithium delivery module. The liquid lithium delivery module comprises a lithium storage region operable to store the liquid lithium, a pumping region operable to move liquid lithium through the lithium delivery module, and a flow control region operable to control the flow of liquid lithium. The pumping region comprises an electromagnetic pump operable to move the liquid lithium using electromagnetism. The flow control region comprises one or more valves operable to control the flow of the liquid lithium. The pumping region is positioned downstream from the lithium storage region and upstream from the flow control region. The liquid lithium resupply module comprises a liquid lithium resupply tank operable to supply liquid lithium to the liquid lithium delivery module and a first temperature control module, which is adapted to control the temperature of the liquid lithium resupply tank.

In at least one aspect, a liquid lithium delivery system is provided. The liquid lithium delivery system comprises a liquid lithium delivery module. The liquid lithium delivery module comprises a lithium storage region operable to store liquid lithium and a pumping region operable to move the liquid lithium through the liquid lithium delivery module. The pumping region comprises an electromagnetic pump operable to move the liquid lithium using electromagnetism. The liquid lithium delivery module further comprises a flow control region operable to control a flow of the liquid lithium, comprising one or more valves operable to control the flow of the liquid lithium, wherein the pumping region is positioned downstream from the lithium storage region and upstream from the flow control region. The liquid lithium delivery system further comprises a liquid lithium resupply module detachably and fluidly coupled with the liquid lithium delivery module. The liquid lithium resupply module comprises a liquid lithium resupply tank operable to supply liquid lithium to the liquid lithium delivery module and a first temperature control module, which is adapted to control a temperature of the liquid lithium resupply tank. The liquid lithium delivery system further comprises a liquid lithium supply line that fluidly couples the liquid lithium resupply tank with the liquid lithium delivery module. The liquid lithium delivery system further comprises a filter assembly positioned along the liquid lithium supply line operable to remove impurities from the lithium liquid flowing through the liquid lithium supply line.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

The following disclosure describes methods and systems for the production, delivery, and deposition of lithium metal of high purity. Certain details are set forth in the following description and in FIGS. 1A-3 to provide a thorough understanding of various implementations of the disclosure. Other details describing well-known structures and systems often associated with lithium metal purification, deposition and delivery are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Implementations described herein may be used with a reel-to-reel coating system, such as TopMet™, SmartWeb™, TopBeam™, all of which are available from Applied Materials, Inc. of Santa Clara, Calif. Other tools and processes that use lithium metal of high purity may also be adapted to benefit from the implementations described herein. The apparatus description described herein is illustrative and should not be construed or interpreted as limiting the scope of the implementations described herein. It should also be understood that although some implementations described herein are shown with a reel-to-reel process, the implementations described herein may also be performed on discrete substrates.

Pure liquid lithium is difficult to obtain because of the high reactivity of lithium. A "skin" tends to form on the liquid lithium when it reacts with contaminants in the atmosphere. This "skin" then prevents proper flowing of the liquid lithium. This "skin" is also difficult to filter and tends to clog any flow regulation system that includes flow restrictions. Previous solutions were to control the melting of solid lithium and filter the impurities generated. However, these previous solutions suffered from several drawbacks. First, previous solutions either lacked flow control or provided very inaccurate flow control. Second, these previous solutions suffered from temperature variations in the melted lithium. Third, these previous solutions resulted in a significant amount of impurities in the melted lithium, which increased the clogging of lines and valves as well as preventing the use of smaller flow orifices and nozzles. Some implementations of the present disclosure provide access to high purity liquid lithium with reduced contaminants, improved flow control and accuracy, and improved temperature stability. This reduction of contaminants provided by implementations of the present disclosure enables the use of small flow orifices and nozzles for improved coating applications.

In at least one aspect, liquid lithium is driven by an electromagnetic pump. Flow is regulated by a matrix of flow orifices and a flow control valve, operated via PID feedback on an EM flowmeter.

In at least one aspect, the liquid lithium is kept in a pressure rated cylinder. The dip tube feeding the pump takes the lithium in the middle section of the cylinder. The top layer and the bottom layer of the liquid are contaminated, only the middle layer is used. The liquid lithium is refilled when X-percentage of the lithium has been used. X is before the contaminated top layer reaches the dip tube.

Printed electronics and energy storage devices, which are lithium-based, may benefit from the implementations described herein. Energy storage devices, for example, batteries, typically include a positive electrode, a negative electrode separated by a porous separator and electrolyte, which is used as an ion-conductive matrix. Graphite anodes are the current state of the art but the industry is moving from the graphite based anode to silicon blended graphite anodes to increase cell energy density. However, silicon blended graphite anodes often suffer from irreversible capacity loss that occurs during the first cycle. Thus, there is a need for methods for replenishing this first cycle capacity loss. Deposition of lithium metal having high purity as described herein is one such method for replenishing this first cycle capacity loss of silicon blended graphite anode. Additionally, the implementations described herein can be used to form lithium metal electrodes of high purity.

Figure 1A:
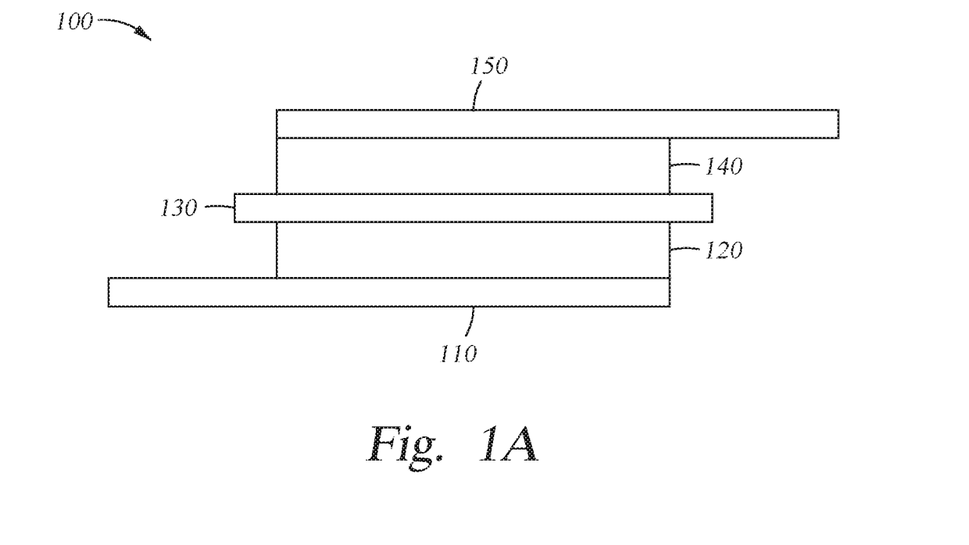
FIG. 1A illustrates a cross-sectional view of one implementation of an energy storage device incorporating an anode electrode structure formed according to implementations described herein.

FIG. 1A illustrates a cross-sectional view of one implementation of an energy storage device 100 including a negative electrode structure including high purity lithium formed according to implementations described herein. The energy storage device 100 may be a lithium-ion energy storage device that uses solid electrolytes (e.g., a solid-state battery) as well as a lithium-ion energy storage device, which uses a liquid or polymer electrolyte. The energy storage device 100 has a positive ("cathode") current collector 110, a positive electrode structure 120 (i.e., cathode), a separator 130, a negative electrode structure 140, and a negative ("anode") current collector 150. In at least one aspect, the negative electrode structure 140 is a lithium metal electrode including high purity lithium formed according to implementations described herein. In another implementation, at least one of the positive electrode structure 120 and the negative electrode structure 140, which may comprise graphite or silicon-graphite, are pre-lithiated with high purity lithium according to the implementations described herein. Note in FIG. 1A that the current collectors are shown to extend beyond the stack, although it is not necessary for the current collectors to extend beyond the stack, the portions extending beyond the stack may be used as tabs.

The current collectors 110, 150, on positive electrode structure 120 and negative electrode structure 140, respectively, can be identical or different electronic conductors. Examples of metals that the current collectors 110, 150 may be comprised of include aluminum (Al), copper (Cu), zinc (Zn), nickel (Ni), cobalt (Co), tin (Sn), silicon (Si), manganese (Mn), magnesium (Mg), alloys thereof, and combinations thereof. In at least one aspect, at least one of the current collectors 110, 150 is perforated. Furthermore, current collectors may be of any form factor (e.g., metallic foil, sheet, or plate), shape and micro/macro structure. Generally, in prismatic cells, tabs are formed of the same material as the current collector and may be formed during fabrication of the stack, or added later.

The negative electrode structure 140 or anode may be any material compatible with the positive electrode structure 120. In at least one aspect, the negative electrode structure 140 is a lithium metal electrode including high purity lithium formed according to implementations described herein. In another implementation, the negative electrode structure is lithiated or pre-lithiated according to the implementations described herein. The negative electrode structure 140 may have an energy capacity greater than or equal to 372 mAh/g, preferably ≥700 mAh/g, and most preferably ≤1000 mAh/g. The negative electrode structure 140 may be constructed from a carbonaceous material (e.g., natural graphite or artificial graphite), lithium metal, lithium metal alloys, silicon-containing graphite, silicon, nickel, copper, tin, indium, aluminum, oxides thereof, combinations thereof, or a mixture of a lithium metal and/or lithium alloy and materials such as carbon (e.g. coke, graphite), nickel, copper, tin, indium, aluminum, silicon, oxides thereof, or a combination thereof. In at least one aspect, the negative electrode structure 140 comprises intercalation compounds containing lithium or insertion compounds containing lithium. In at least one aspect, the negative electrode structure 140 is a silicon graphite anode. Suitable examples of carbonaceous materials include natural and artificial graphite, partially graphitized or amorphous carbon, petroleum coke, needle coke, and various mesophases.

The positive electrode structure 120 or cathode may be any material compatible with the anode and may include an intercalation compound, an insertion compound, or an electrochemically active polymer. Suitable intercalation materials include, for example, lithium-containing metal oxides, $MoS_2$, $FeS_2$, $MnO_2$, $TiS_2$, $NbSe_3$, $LiCoO_2$, $LiNiO_2$, $LiMnO_2$, $LiMn_2O_4$, $V_6O_{13}$ and $V_2O_5$. Suitable polymers include, for example, polyacetylene, polypyrrole, polyaniline, and polythiophene. In at least one aspect, the positive electrode structure 120 or cathode is composed of a layered oxide, such as lithium cobalt oxide, an olivine, such as lithium iron phosphate, or a spinel, such as lithium manganese oxide. Exemplary lithium-containing oxides may be layered, such as lithium cobalt oxide ($LiCoO_2$), or mixed metal oxides, such as $LiNi_xCo_{1-2x}MnO_2$, $LiNiMnCoO_2$ ("NMC"), $LiNi_{0.5}Mn_{1.5}O_4$, $Li(Ni_{0.8}Co_{0.15}Al_{0.05})O_2$, $LiMn_2O_4$, and doped lithium rich layered-layered materials, wherein x is zero or a non-zero number. Exemplary phosphates may be iron olivine ($LiFePO_4$) and it is variants (such as $LiFe_{(1-x)}Mg_xPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$, wherein x is zero or a non-zero number. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$.

In at least one aspect, the separator 130 is a porous polymeric ion-conducting polymeric substrate. In at least one aspect, the porous polymeric substrate is a multi-layer polymeric substrate. In at least one aspect, the separator 130 includes any commercially available polymeric microporous membranes (e.g., single or multi-ply), for example, those products produced by Polypore (Celgard LLC., of Charlotte, N.C.), Toray Tonen (Battery separator film (BSF)), SK Energy (lithium ion battery separator (LiBS)), Evonik industries (SEPARION® ceramic separator membrane), Asahi Kasei (Hipore™ polyolefin flat film membrane), and DuPont (Energain®).

In at least one aspect, the separator 130 is a lithium-ion conducting material. The lithium-ion conducting material may be a lithium-ion conducting ceramic or a lithium-ion conducting glass. The Li-ion conducting material may be comprised of one or more of LiPON, doped variants of either crystalline or amorphous phases of $Li_7La_3Zr_2O_{12}$, doped anti-perovskite compositions, $Li_2S$—$P_2S_5$, $Li_{10}GeP_2S_{12}$, and $Li_3PS_4$, lithium phosphate glasses, (1−x)LiI-(x)$Li_4SnS_4$, xLiI-(1−x)$Li_4SnS_4$, mixed sulfide and oxide electrolytes (crystalline LLZO, amorphous (1−x)LiI-(x)$Li_4SnS_4$ mixture, and amorphous xLiI-(1−x)$Li_4SnS_4$) for example. In at least one aspect, x is between 0 and 1 (e.g., 0.1, 0.2, 0.3, 0.4, 0.5, 0.6, 0.7, 0.8, and 0.9).

In at least one aspect, the electrolyte infused in cell components 120, 130, and 140 can be comprised of a liquid/gel or a solid polymer and may be different in each. In at least one aspect, the electrolyte primarily includes a salt and a medium (e.g., in a liquid electrolyte, the medium may be referred to as a solvent; in a gel electrolyte, the medium may be a polymer matrix). The salt may be a lithium salt. The lithium salt may include, for example, $LiPF_6$, $LiAsF_6$, $LiCF_3SO_3$, $LiN(CF_3SO_3)_3$, $LiBF_6$, and $LiClO_4$, BETTE electrolyte (commercially available from 3M Corp. of Minneapolis, Minn.) and combinations thereof. Solvents may include, for example, ethylene carbonate (EC), propylene carbonate (PC), EC/PC, 2-MeTHF(2-methyltetrahydrofuran)/EC/PC, EC/DMC (dimethyl carbonate), EC/DME (dimethyl ethane), EC/DEC (diethyl carbonate), EC/EMC (ethyl methyl carbonate), EC/EMC/DMC/DEC, EC/EMC/DMC/DEC/PE, PC/DME, and DME/PC. Polymer matrices may include, for example, PVDF (polyvinylidene fluoride), PVDF:THF (PVDF:tetrahydrofuran), PVDF:CTFE (PVDF:chlorotrifluoroethylene) PAN (polyacrylonitrile), and PEO (polyethylene oxide).

Figure 1B:
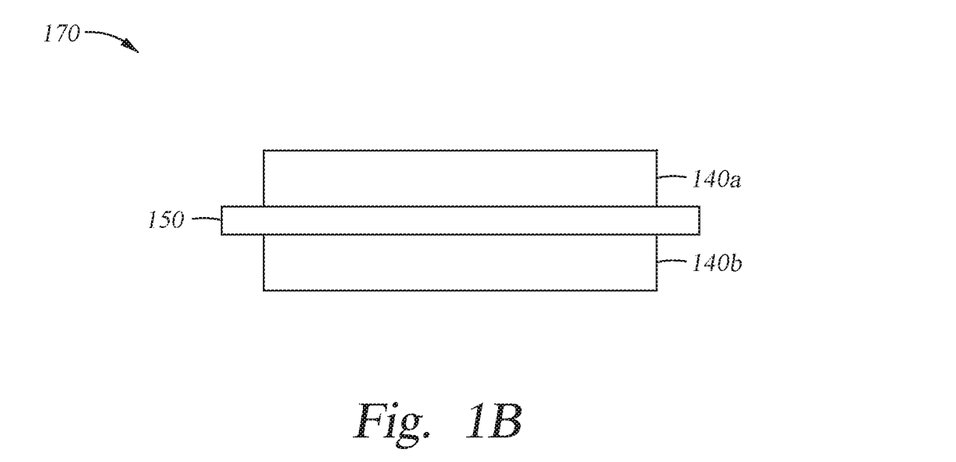
FIG. 1B illustrates a cross-sectional view of an anode electrode structure formed according to implementations described herein.

FIG. 1B illustrates a cross-sectional view of a dual-sided electrode structure 170 that is pre-lithiated according to implementations described herein. The dual-sided electrode structure 170 comprises the negative current collector 150 with a negative electrode structure 140a, 140b formed on opposing sides of the negative current collector 150.

Figure 2:
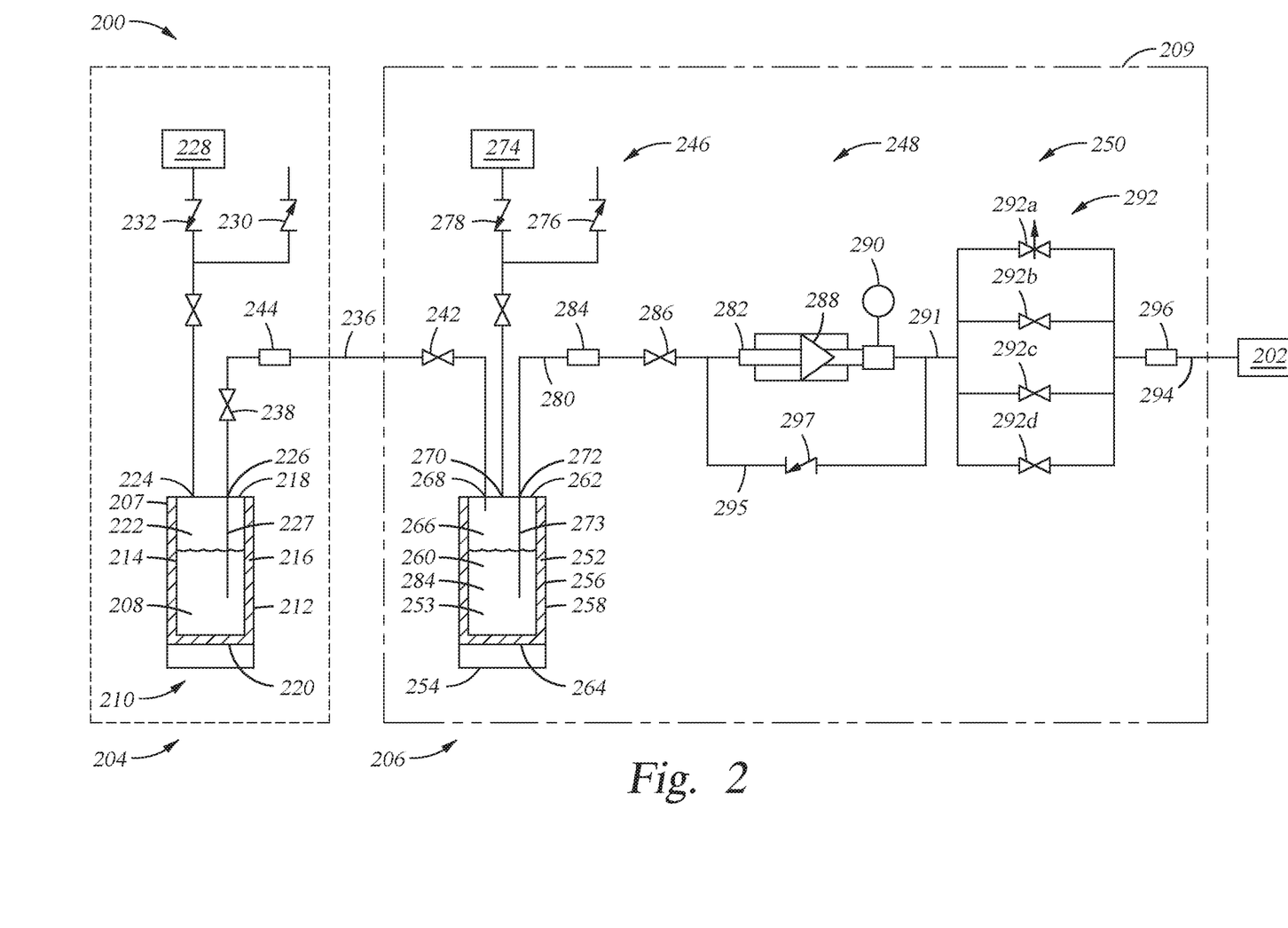
FIG. 2 illustrates a schematic view of a lithium delivery system according to implementations described herein.

FIG. 2 illustrates a schematic view of a liquid lithium delivery system 200 according to implementations described herein. The liquid lithium delivery system 200 is fluidly coupled with a processing chamber 202. The processing chamber 202 may be any chamber suitable for processing and depositing liquid lithium metal. Examples of suitable processing chambers include, but are not limited to, PVD systems, such as an electron-beam evaporator, a thermal evaporation system, or a sputtering system, a thin film transfer system, a slot-die deposition system, a comma bar coating system, a three-dimensional printing system, or other suitable coating process. The liquid lithium delivery system 200 includes a liquid lithium resupply module 204 and a lithium delivery module 206.

The liquid lithium resupply module 204 includes a liquid lithium resupply tank 207 operable to supply liquid lithium to the lithium delivery module 206. The liquid lithium resupply tank 207 is detachably coupled with the lithium delivery module 206. In at least one aspect, the liquid lithium resupply tank 207 is refillable. The liquid lithium resupply tank 207 contains a supply of lithium 208. In at least one aspect, the supply of lithium 208 is in liquid form. In at least one aspect, the supply of lithium 208 is in solid form, which is heated to above the melting point of lithium to form liquid lithium prior to entering the lithium delivery module 206. In at least one aspect, the liquid lithium resupply tank 207 is positioned on a temperature control module 210, which is adapted to control the temperature of the liquid lithium resupply tank 207. For example, in at least one aspect where lithium is supplied in solid form, the temperature control module 210 comprises a temperature control device that applies heat to the solid lithium sufficient to melt the solid lithium. Any suitable temperature control device sufficient operable to control the temperature of the liquid lithium resupply tank 207 may be used in the temperature control module 210. Examples of temperature control devices include heat exchangers, resistive heaters, temperature control jackets, or combinations thereof. In at least one aspect, the liquid lithium resupply tank 207 is covered by a temperature control jacket 212 operable to control the temperature of the liquid lithium resupply tank 207.

The liquid lithium resupply tank 207 typically includes a canister (e.g., cylinder or vessel) 214 having a sidewall 216, a top surface 218 and a bottom surface 220 encompassing an interior volume 222 therein. The liquid lithium resupply tank 207 further includes an inlet port 224 and an outlet port 226 in fluid communication with the interior volume 222. The inlet port 224 is disposed through the lid or the top surface 218 of the canister 214 and is operable to provide a gas to the interior volume 222 of the canister 214. The outlet port 226 is disposed through the lid or the top surface 218 of the canister 214 and is operable to allow liquid lithium to flow out of the canister 214 and into the lithium delivery module 206. In at least one aspect, the outlet port 226 is fluidly coupled with a dip tube 227. In at least one aspect, the dip tube 227 is positioned toward the middle portion of the supply of lithium 208 to avoid contaminants, which form on the top surface of the supply of lithium 208 and the bottom of the lithium 208. In at least one aspect, the inlet port 224 is fluidly coupled with an inert gas source 228 operable to supply an inert gas to the interior volume 222 of the canister 214. The flow of inert gas from the inert gas source 228 into the interior volume 222 of the canister 214 may be controlled by one or more check valves 230, 232. The check valves 230, 232 allow the inert gas to flow in one direction and block ("check") fluid flowing in the reverse direction. The inert gas may be used to pressurize the canister 214 and push the liquid lithium toward the lithium delivery module 206.

In at least one aspect, the canister 214 is certified by the Department of Transportation (DOT). For reasons of chemical compatibility and mechanical strength, the canister 214 is typically made of a stainless steel, such as 316 stainless steel (316 SST). The material of the canister 214 should be fairly chemically inert since lithium is highly reactive and easily contaminated. In at least one aspect, the material of the canister 214 is cleaned and/or electropolished.

In the implementation of FIG. 2, the liquid lithium resupply tank 207 is fluidly coupled with the lithium delivery module via liquid lithium supply line 236. In at least one aspect, the liquid lithium supply line 236 includes one or more shut-off valves 238, 242 operable to control the flow of liquid lithium into the lithium delivery module 206. In at least one aspect, the liquid lithium supply line 236 further includes a first filter assembly 244 operable to remove impurities from the stream of lithium liquid flowing through the lithium supply line 236. It should be understood that although the first filter assembly 244 is positioned in the liquid lithium resupply module 204, the filter may also be positioned in the lithium delivery module 206.

The first filter assembly 244 comprises any design and/or material suitable for removal of unwanted quantities of solid and gaseous contaminants (e.g., lithium nitrides and lithium oxides) from the liquid lithium. In at least one aspect, the first filter assembly 244 includes a skimmer device operable to remove solid contaminants from the surface of the liquid lithium.

In at least one aspect, the first filter assembly 244 includes a metal mesh filter operable to remove solid contaminants from the liquid lithium. The metal mesh filter may comprise any material compatible with liquid lithium. In at least one aspect, the metal mesh is composed of a material selected form copper, aluminum, nickel, or combinations thereof. In at least one aspect, the metal mesh filter is composed of stainless steel (SST). In at least one aspect, the metal mesh filter is composed of copper, aluminum, nickel, stainless steel, or combinations thereof. The dimensions of the metal mesh filter are typically selected based on the size of the contaminants to be filtered out of the lithium metal. The metal mesh filter may have a wire diameter between about 0.050 micrometers and about 200 micrometers. The metal mesh filter may have a wire diameter between about 50 micrometers and about 100 micrometers. In at least one aspect, the metal mesh filter may have an opening between about 5 micrometers and about 200 micrometers. In at least one aspect, the metal mesh filter may have an opening between about 10 micrometers and about 100 micrometers. As used herein with reference to the metal mesh filter, the term "openings" refers to the distance between two adjacent parallel wires.

In at least one aspect, the first filter assembly 244 includes a foam filter operable to remove solid contaminants from the liquid lithium. The foam filter may comprise any material compatible with the liquid lithium. In at least one aspect, the foam mesh is composed of a material selected form copper, copper-zinc, aluminum, nickel, stainless steel, or combinations thereof. In at least one aspect, the foam filter is composed of reticulated foam material. The dimensions of the cells and porosity of the foam material is selected to remove the solid contaminants from the liquid lithium while allowing the purified liquid lithium to flow through the foam material.

In at least one aspect, the lithium delivery module 206 includes a housing 209 for enclosing the components of the lithium delivery module 206. In at least one aspect, the housing 209 is a shippable container certified by the DOT. The lithium delivery module 206 includes a lithium storage region 246 operable to store the liquid lithium and a flow control region 250 operable to control the flow of liquid lithium to the processing chamber 202. In at least one aspect, the lithium delivery module 206 further includes an optional pumping region 248 operable to move liquid lithium through the lithium delivery module 206. If present, the optional pumping region is positioned downstream from the lithium storage region 246 and upstream from the flow control region 250.

The lithium storage region 246 includes a liquid lithium storage tank 252 operable to store liquid lithium. The liquid lithium storage tank 252 typically contains a supply of liquid lithium 253. In at least one aspect, the liquid lithium storage tank 252 is positioned on a temperature control module 254, which is adapted to control the temperature of the liquid lithium storage tank 252. Any suitable temperature control device may be used in the temperature control module 254.

The temperature control module 254 is typically set to a temperature above the melting point of lithium, sufficient to maintain the liquid lithium in liquid phase. Examples of temperature control devices include heat exchangers, resistive heaters, temperature control jackets, or combinations thereof. In at least one aspect, the liquid lithium storage tank 252 is covered by a temperature control jacket 256 operable to control the temperature of the liquid lithium storage tank 252.

The liquid lithium storage tank 252 typically includes a canister (e.g., cylinder or vessel) 258 having a sidewall 260, a top surface 262 and a bottom surface 264 encompassing an interior volume 266 therein. The liquid lithium storage tank 252 further includes a first inlet port 268, a second inlet port 270 and an outlet port 272 in fluid communication with the interior volume 266. The first inlet port 268 is disposed through the lid or the top surface 262 of the canister 258 and is operable to provide liquid lithium to the interior volume 266 of the canister 258. The first inlet port 268 is fluidly coupled with the liquid lithium supply line 236 for receiving liquid lithium from the liquid lithium resupply tank 207. The second inlet port 270 is disposed through the lid or the top surface 262 of the canister 258 and is operable to provide gas to the interior volume 266 of the canister 258. The second inlet port 270 is fluidly coupled with an inert gas source 274 operable to supply an inert gas to the interior volume 266 of the canister 258. The flow of inert gas from the inert gas source 274 into the interior volume 266 of the canister 258 may be controlled by one or more check valves 276, 278. The outlet port 272 is disposed through the lid or the top surface 262 of the canister 258 and is operable to allow liquid lithium to flow out of the canister 258 and into the pumping region 248. In at least one aspect, the outlet port 272 is fluidly coupled with a dip tube 273. In at least one aspect, the dip tube 273 is positioned toward the middle portion of the supply of liquid lithium 253 to avoid contaminants, which form on the top surface of the supply of liquid lithium 253 and the bottom of the supply of liquid lithium 253.

In at least one aspect, the canister 258 is certified by the Department of Transportation (DOT). For reasons of chemical compatibility and mechanical strength, the canister 258 is typically made of a stainless steel, such as 316 stainless steel (316 SST). The material of the canister 258 should be fairly chemically inert since lithium is highly reactive and easily contaminated.

A fluid supply line 280 couples the outlet port 272 with a conduit 282. In at least one aspect, a second filter assembly 284 is positioned along the fluid supply line 280. In at least one aspect, the second filter assembly 284 is similar to the first filter assembly 244. One or more shut-off valves 286 may be positioned along the fluid supply line 280 operable to control the flow of liquid lithium from the liquid lithium storage tank 252 through the fluid supply line 280 and into the pumping region 248. The pumping region 248 includes a pump 288 operable to move the liquid lithium through the lithium delivery module 206. The pumping region 248 optionally includes a flow meter 290 operable to monitor the flow of liquid lithium through the pumping region 248. In at least one aspect, the flow meter 290 is positioned downstream from the pump 288. The pump 288 may be any suitable pump operable to move liquid metal. In at least one aspect, the pump 288 is an electromagnetic pump that moves liquid lithium using electromagnetism. The electromagnetic pump may be an electromagnetic pump of any type. In at least one aspect, the electromagnetic pump causes an electromagnetic force to act on the liquid lithium by an induced current flowing through the liquid lithium due to a moving magnetic field generated by a direct or alternating current and the moving magnetic field, thus discharging the liquid lithium in the same direction as a moving direction of the magnetic field. The flow meter 290 may be any suitable flow meter for measuring the flow of the liquid lithium. The flow meter 290 may communicate with the pump 288 and/or shut-off valve 286 via a feedback loop (not shown).

The pump 288 in combination with the flow meter 290 provides a stable system with a feedback loop in terms of flow regulation.

In at least one aspect, the flow meter 290 is an electromagnetic flow meter. The electromagnetic flowmeter typically includes a magnet applying a magnetic field to the lithium metal fluid flowing through the duct line and an electrode detecting a current generated in the lithium metal fluid due to a flow of the lithium metal fluid linked with the magnetic field, and measures an electromotive force by a magnetic field applied in a direction orthogonal to a flow direction of the lithium metal fluid and an electric field generated in a direction orthogonal to any of the magnetic field direction and the flow direction, thus measuring a flow amount.

In at least one aspect, the flow meter 290 is an ultrasonic flow meter. The ultrasonic flowmeter includes a transmitter and a receiver for an ultrasonic wave in piping, calculates a flow rate of the lithium metal fluid from a time until a signal arrival using a characteristic of a propagation rate of the ultrasonic wave being related to a flow rate of a fluid, and calculates a flow amount from a known section.

The flow control region 250 is fluidly coupled with the pumping region 248 via fluid delivery line 291. The flow control region 250 typically includes one or more valves 292 for delivering and controlling the flow of lithium liquid metal to the processing chamber 202. Although four valves 292a-292d are shown in FIG. 2, any number of valves may be used. The valves 292a-292d may be a needle valve or the like, and is adjustable to set the flow of liquid lithium metal to the processing chamber 202. In at least one aspect, valve 292a is a regulator valve and valves 292b-292d are needle valves.

The flow control region 250 is fluidly coupled with the processing chamber 202 via fluid delivery line 294. In at least one aspect, a third filter assembly 296 is positioned along the fluid delivery line 294 operable to remove any additional contaminants from the liquid lithium metal. In at least one aspect, the third filter assembly 296 is similar to the first filter assembly 244. The liquid lithium delivery system 200 may contain additional valves, pressure regulators, pressure transducers, and pressure indicators, which are not described in detail for the sake of brevity. In addition, the fluid delivery lines and fluid supply lines shown may be heated to keep the liquid lithium in liquid phase.

In at least one aspect, the fluid delivery line 291 includes a feedback loop 295 for delivering liquid lithium back to the fluid supply line 280. In at least one aspect, the feedback loop 295 includes a check valve 297 operable to control the flow of liquid lithium through the feedback loop 295. In at least one aspect, the feedback loop 295 delivers the liquid lithium to the fluid supply line 280 before the second filter assembly 284 where additional contaminants are removed from the liquid lithium. In at least one aspect, the feedback loop 295 delivers the liquid lithium to the liquid lithium storage tank 252.

Figure 3:
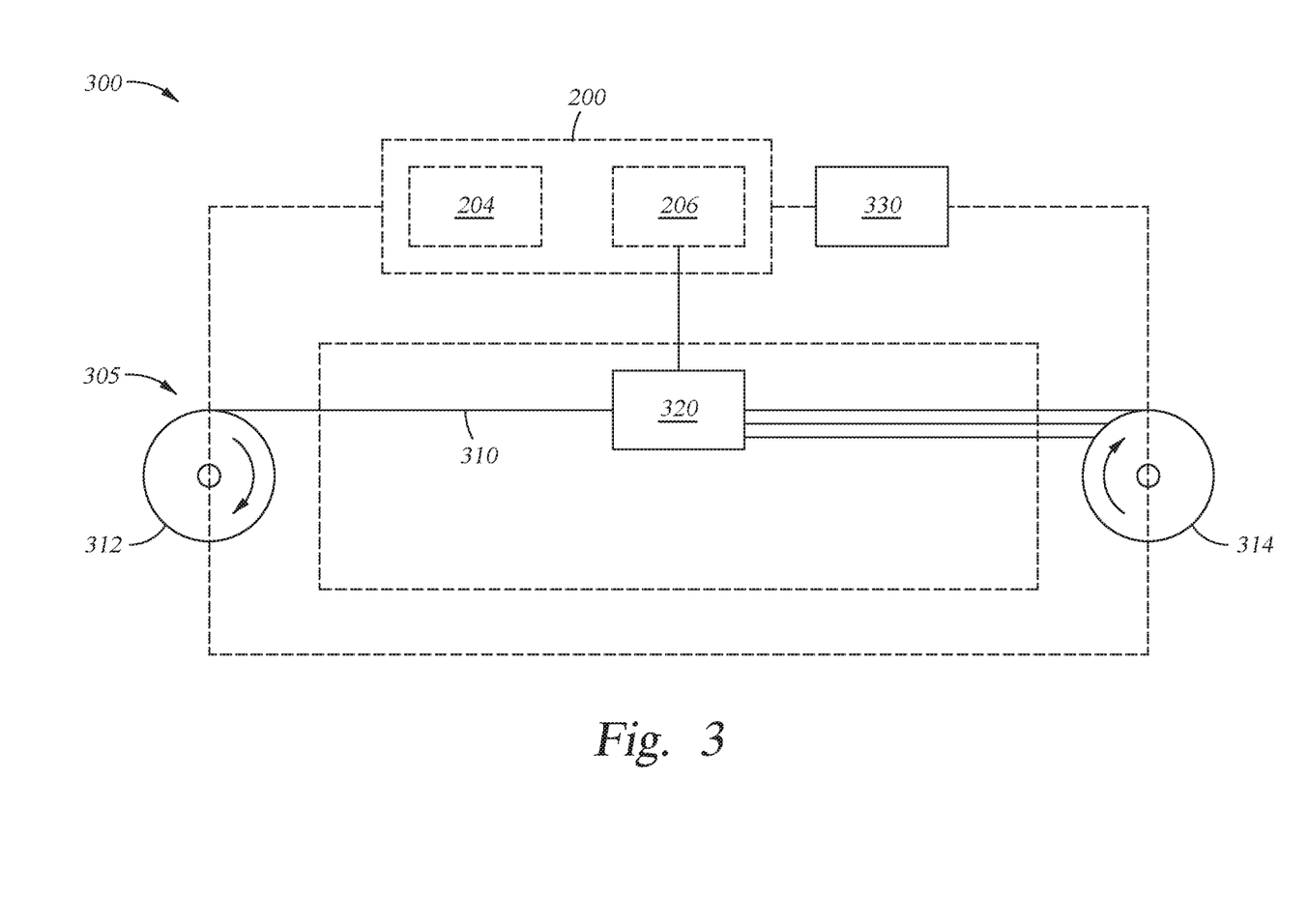
FIG. 3 illustrates a schematic view of an integrated processing tool incorporating a lithium delivery system according to implementations described herein.

FIG. 3 illustrates a schematic view of an integrated processing tool 300 incorporating the liquid lithium delivery system 200 according to implementations described herein.

The integrated processing tool 300 may be used to form an anode structure containing high purity lithium formed according to implementations described herein. In certain implementations, the integrated processing tool 300 comprises one or more processing modules or chambers 320 arranged in a line, each operable to perform one processing operation to a continuous sheet of material 310. In at least one aspect, the integrated processing tool 300 is a web tool. In at least one aspect, the continuous sheet of material 310 is a conductive substrate. In at least one aspect, the continuous sheet of material 310 is a flexible conductive substrate. In at least one aspect, the continuous sheet of material 310 is an anode current collector, for example, the negative current collector 150. In another implementation, the continuous sheet of material 310 is a currently collector with an electrode structure formed thereon, for example, dual-sided electrode structure 170. The integrated processing tool 300 may comprise feed reel 312 and take-up reel 314 operable to move the continuous sheet of material 310 through the plurality of processing chamber or modules. In at least one aspect, the integrated processing tool 300 includes the processing chamber 320 for depositing a layer of high purity lithium over the continuous sheet of material 310.

In certain implementations, the integrated processing tool 300 comprises a transfer mechanism 305. The transfer mechanism 305 may comprise any transfer mechanism capable of moving the continuous sheet of material 310 through the processing region of the processing chamber 320. The transfer mechanism 305 may comprise common transport architecture. The common transport architecture may comprise a reel-to-reel system with the common take-up-reel 314 and the feed reel 312 for the system. The take-up reel 314 and the feed reel 312 may be individually heated. The take-up reel 314 and the feed reel 312 may be individually heated using an internal heat source positioned within each reel or an external heat source. The common transport architecture may further comprise one or more intermediate transfer reels (not shown) positioned between the take-up reel 314 and the feed reel 312.

Although the integrated processing tool 300 is depicted as having discrete processing regions, in at least one aspect, the integrated processing tool 300 has a common processing region. In some implementation, it may be advantageous to have separate or discrete processing regions, modules, or chambers for each process step. For implementations having discrete processing regions, modules, or chambers, the common transport architecture may be a reel-to-reel system where each chamber or processing region has an individual take-up-reel and feed reel and one or more optional intermediate transfer reels positioned between the take-up reel and the feed reel. The common transport architecture may comprise a track system. The track system extends through the processing regions or discrete processing regions. The track system is operable to transport either a web substrate or discrete substrates. In at least one aspect, the finished anode electrode will not be collected on take-up reel 314 as shown in the figures, but may go directly for integration with the separator film and positive electrodes, etc., to form battery cells.

Any suitable metal film deposition process for depositing low melting temperature metal may be used to deposit the high purity lithium film. The processing chamber 320 for depositing the lithium metal film may include a three-dimensional printing system (e.g., a three-dimensional screen printing system), a PVD system, such as an electron-beam evaporator, a thermal evaporation system, or a sputtering system, a thin film transfer system, or a slot-die deposition system.

The integrated processing tool 300 further includes a system controller 330 operable to control, among other things, the delivery of high purity lithium from the liquid lithium delivery system 200 to the processing chamber 320. The system controller 330 is adapted to control the position and motion of the various components used to complete the transferring process. The system controller 330 is generally designed to facilitate the control and automation of the overall system and typically includes a central processing unit (CPU) (not shown), memory (not shown), and support circuits (or I/O) (not shown). The CPU may be one of any form of computer processors that are used in industrial settings operable to control various system functions, chamber processes and support hardware (e.g., detectors, robots, motors, fluid delivery hardware, gas sources hardware, etc.) and monitor the system and chamber processes (e.g., chamber temperature, process sequence throughput, chamber process time, I/O signals, etc.). The memory is connected to the CPU, and may be one or more of a readily available memory, such as random access memory (RAM), read only memory (ROM), floppy disk, hard disk, or any other form of digital storage, local or remote. Software instructions and data can be coded and stored within the memory for instructing the CPU. The support circuits are also connected to the CPU for supporting the processor in a conventional manner. The support circuits may include cache, power supplies, clock circuits, input/output circuitry, subsystems, and the like. A program (or computer instructions) readable by the system controller 330 determines which tasks are performable on a substrate. Preferably, the program is software readable by the system controller 330, which includes code to perform tasks relating to lithium delivery, monitoring, and execution of the processing sequence tasks and various chamber processes.

Implementations:

Clause 1. A liquid lithium delivery system, comprising a liquid lithium delivery module, comprising a lithium storage region operable to store the liquid lithium, a pumping region operable to move liquid lithium through the lithium delivery module, comprising an electromagnetic pump operable to move the liquid lithium using electromagnetism, and a flow control region operable to control the flow of liquid lithium, comprising one or more valves operable to control the flow of the liquid lithium, wherein the pumping region is positioned downstream from the lithium storage region and upstream from the flow control region.

Clause 2. The delivery system of clause 1, wherein the lithium storage region comprises a liquid lithium storage tank operable to store the liquid lithium and a temperature control module, which is adapted to control the temperature of the liquid lithium storage tank.

Clause 3. The delivery system of clause 2, wherein the temperature control module comprises a heat exchanger, a resistive heater, a temperature control jacket, or combinations thereof.

Clause 4. The delivery system of and of clauses 1 to 3, wherein the liquid lithium storage tank comprises a canister having a sidewall, a top surface, a bottom surface, wherein the sidewall, the top surface and the bottom surface define an interior volume, an inlet port disposed through the top surface of the canister and operable to provide an inert gas to the interior volume of the canister, and an outlet port disposed through the top surface of the canister and operable to allow liquid lithium to flow out of the canister.

Clause 5. The delivery system of any of clauses 1 to 4, wherein the pumping region comprises a flow meter operable to monitor the flow of the liquid lithium through the pumping region.

Clause 6. The delivery system of clause 5, wherein the flow meter is positioned downstream from the pump.

Clause 7. The delivery system of any of clauses 1 to 6, further comprising a liquid lithium supply line that fluidly couples the liquid lithium storage tank with the pump and a filter assembly positioned along the liquid lithium supply line operable to remove impurities from the stream of lithium liquid flowing through the liquid lithium supply line.

Clause 8. The delivery system of clause 7, wherein the filter assembly comprises a metal mesh filter operable to remove contaminants from the liquid lithium.

Clause 9. The delivery system of any of clauses 1 to 8, wherein the one or more valves comprise a needle valve.

Clause 10. The delivery system of clause 9, wherein the one or more valves further comprise a regulator valve.

Clause 11. The delivery system of any of clauses 1 to 10, further comprising a fluid delivery line that fluidly couples the flow control region with a processing chamber, and a filter assembly positioned along the fluid delivery line operable to remove impurities from the stream of lithium liquid flowing through the fluid delivery line.

Clause 12. A liquid lithium delivery system, comprising a liquid lithium delivery module, comprising a lithium storage region operable to store the liquid lithium, a pumping region operable to move liquid lithium through the lithium delivery module, comprising an electromagnetic pump operable to move the liquid lithium using electromagnetism and a flow control region operable to control the flow of liquid lithium, comprising one or more valves operable to control the flow of the liquid lithium, wherein the pumping region is positioned downstream from the lithium storage region and upstream from the flow control region and a liquid lithium resupply module detachably and fluidly couple with the liquid lithium delivery module, comprising a liquid lithium resupply tank operable to supply liquid lithium to the liquid lithium delivery module, and a first temperature control module, which is adapted to control the temperature of the liquid lithium resupply tank.

Clause 13. The delivery system of clause 12, wherein the first temperature control module comprises a heat exchanger, a resistive heater, a temperature control jacket, or combinations thereof.

Clause 14. The delivery system of clause 12 or 13, wherein the liquid lithium resupply tank comprises a canister having a sidewall, a top surface, and a bottom surface, wherein the sidewall, the top surface and the bottom surface define an interior volume, an inlet port disposed through the top surface of the canister and operable to provide an inert gas to the interior volume of the canister, and an outlet port disposed through the top surface of the canister and operable to allow liquid lithium to flow out of the canister and into the liquid lithium delivery module.

Clause 15. The delivery system of clause 14, wherein the inlet port is fluidly coupled with an inert gas source.

Clause 16. The delivery system of any of clauses 12 to 15, further comprising a liquid lithium supply line that fluidly couples the liquid lithium resupply tank with the lithium delivery module, and a filter assembly positioned along the liquid lithium supply line operable to remove impurities from the stream of lithium liquid flowing through the liquid lithium resupply line.

Clause 17. The delivery system of clause 16, wherein the filter assembly comprises a metal mesh filter operable to remove contaminants from the liquid lithium.

Clause 18. The delivery system of any of clauses 12 to 17, wherein the lithium storage region comprises a liquid lithium storage tank operable to store the liquid lithium, and a second temperature control module, which is adapted to control the temperature of the liquid lithium storage tank.

Clause 19. The delivery system of clause 18, wherein the second temperature control module comprises a heat exchanger, a resistive heater, a temperature control jacket, or combinations thereof.

Clause 20. The delivery system of clause 18, wherein the liquid lithium storage tank comprises a canister having a sidewall, a top surface, and a bottom surface, wherein the sidewall, the top surface and the bottom surface define an interior volume, an inlet port disposed through the top surface of the canister and operable to provide an inert gas to the interior volume of the canister, and an outlet port disposed through the top surface of the canister and operable to allow liquid lithium to flow out of the canister.

Clause 21. The delivery system of any of clauses 12 to 20, wherein the pumping region comprises a flow meter operable to monitor the flow of the liquid lithium through the pumping region.

Clause 22. The delivery system of clause 21, wherein the flow meter is positioned downstream from the electromagnetic pump.

Clause 23. The delivery system of any of clauses 12 to 22, further comprising a liquid lithium supply line that fluidly couples the liquid lithium storage tank with the pump, and a filter assembly positioned along the liquid lithium supply line operable to remove impurities from the stream of lithium liquid flowing through the liquid lithium supply line.

Clause 24. The delivery system of clause 23, wherein the filter assembly comprises a metal mesh filter operable to remove contaminants from the liquid lithium.

Clause 25. The delivery system of any of clauses 12 to 24, wherein the one or more valves comprise a needle valve.

Clause 26. The delivery system of clause 25, wherein the one or more valves further comprise a regulator valve.

Clause 27. The delivery system of any of clauses 12 to 25, further comprising a fluid delivery line that fluidly couples the flow control region with a processing chamber, and a filter assembly positioned along the fluid delivery line operable to remove impurities from the stream of lithium liquid flowing through the fluid delivery line.

Clause 28. A liquid lithium delivery system, comprising a liquid lithium delivery module, comprising a lithium storage region operable to store the liquid lithium, a pumping region operable to move the liquid lithium through the lithium delivery module, comprising an electromagnetic pump operable to move the liquid lithium using electromagnetism, and a flow control region operable to control the flow of the liquid lithium, comprising one or more valves operable to control the flow of the liquid lithium, wherein the pumping region is positioned downstream from the lithium storage region and upstream from the flow control region, and a liquid lithium resupply module detachably and fluidly coupled with the liquid lithium delivery module, comprising a liquid lithium resupply tank operable to supply liquid lithium to the liquid lithium delivery module, and a first temperature control module, which is adapted to control the temperature of the liquid lithium resupply tank, a liquid lithium supply line that fluidly couples the liquid lithium resupply tank with the lithium delivery module, and a filter assembly positioned along the liquid lithium supply line operable to remove impurities from the lithium liquid flowing through the liquid lithium resupply line.

Clause 29. The delivery system of claim 28, wherein the filter assembly comprises a metal mesh filter operable to remove contaminants from the liquid lithium.

Clause 30. The delivery system of claim 28 or 29, wherein the lithium storage region comprises a liquid lithium storage tank operable to store the liquid lithium, and a second temperature control module, which is operable to control the temperature of the liquid lithium storage tank.

Clause 31. The delivery system of any of claims 28 to 30, wherein the second temperature control module comprises a heat exchanger, a resistive heater, a temperature control jacket, or a combination thereof.

Clause 32. The delivery system of any of claims 28 to 31, wherein the liquid lithium storage tank comprises a canister having a sidewall, a top surface, and a bottom surface, wherein the sidewall, the top surface and the bottom surface define an interior volume, an inlet port disposed through the top surface of the canister and operable to provide an inert gas to the interior volume of the canister, and an outlet port disposed through the top surface of the canister and operable to allow liquid lithium to flow out of the canister.

Clause 33. The delivery system of any of claims 28 to 32, wherein the pumping region comprises a flow meter operable to monitor the flow of the liquid lithium through the pumping region.

Clause 34. The delivery system of any of claims 28 to 33, wherein the flow meter is positioned downstream from the electromagnetic pump.

Clause 35. The delivery system of any of claims 28 to 34, further comprising a liquid lithium supply line that fluidly couples the liquid lithium storage tank with the electromagnetic pump, and a filter assembly positioned along the liquid lithium supply line operable to remove impurities from the lithium liquid flowing through the liquid lithium supply line.

Clause 36. The delivery system of any of claims 28 to 35, wherein the filter assembly comprises a metal mesh filter operable to remove contaminants from the liquid lithium.

Clause 37. The delivery system of any of claims 28 to 36, wherein the one or more valves comprise a needle valve.

Clause 38. The delivery system of any of claims 28 to 37, wherein the one or more valves further comprise a regulator valve.

Clause 39. The delivery system of any of claims 28 to 38, further comprising a fluid delivery line that fluidly couples the flow control region with a processing chamber, and a filter assembly positioned along the fluid delivery line operable to remove impurities from the lithium liquid flowing through the fluid delivery line.

In summary, some benefits of implementations of the present disclosure include a liquid lithium delivery system that provides access to high purity liquid lithium with reduced contaminants, improved flow control and accuracy, and improved temperature stability. This reduction of contaminants provided by implementations of the present disclosure enables the use of small flow orifices and nozzles for improved quality in coating applications.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to implementations of the present disclosure, other and further implementations of the disclosure may be devised without departing from the basic scope thereof, and the scope thereof is determined by the claims that follow.

The invention claimed is:

1. A liquid lithium delivery system, comprising:
a liquid lithium delivery module, comprising:
a lithium storage region operable to store liquid lithium, comprising:
a liquid lithium storage tank having an outlet port;
a pumping region operable to move the liquid lithium through the liquid lithium delivery module, comprising:
an electromagnetic pump operable to move the liquid lithium using electromagnetism;
a flow control region operable to control a flow of the liquid lithium, comprising one or more valves operable to control the flow of the liquid lithium, wherein the pumping region is positioned downstream from the lithium storage region and upstream from the flow control region;
a fluid supply line fluidly coupling the outlet port of the liquid lithium storage tank with an inlet of the electromagnetic pump;
a flow control valve positioned along the fluid supply line and operable to control the flow of the liquid lithium from the liquid lithium storage tank through the fluid supply line and into the electromagnetic pump;
a fluid delivery line fluidly coupling an outlet of the electromagnetic pump with the one or more valves;
an electromagnetic flow meter positioned along the fluid delivery line and operable to monitor the flow of the liquid lithium through the electromagnetic pump and communicate with the flow control valve via a feedback loop; and
a feedback line positioned downstream from the electromagnetic flow meter and fluidly coupling the fluid delivery line with the fluid supply line, the feedback line operable to deliver the liquid lithium back to the fluid supply line.

2. The liquid lithium delivery system of claim 1, wherein the lithium storage region further comprises:
a temperature control module, which is adapted to control a temperature of the liquid lithium storage tank.

3. The liquid lithium delivery system of claim 2, wherein the temperature control module comprises a heat exchanger, a resistive heater, a temperature control jacket, or a combination thereof.

4. The liquid lithium delivery system of claim 2, wherein the liquid lithium storage tank comprises:
a canister having:
a sidewall;
a top surface; and
a bottom surface, wherein the sidewall, the top surface and the bottom surface define an interior volume;
an inlet port disposed through the top surface of the canister and operable to provide an inert gas to the interior volume of the canister; and
the outlet port disposed through the top surface of the canister and operable to allow the liquid lithium to flow out of the canister.

5. The liquid lithium delivery system of claim 1, wherein the feedback line comprises a check valve operable to control the flow of the liquid lithium from the fluid delivery line to the fluid supply line.

6. The liquid lithium delivery system of claim 1, wherein the electromagnetic flow meter is positioned downstream from the electromagnetic pump.

7. The liquid lithium delivery system of claim 1, further comprising:
a filter assembly positioned along the fluid supply line operable to remove impurities from the flow of the liquid lithium flowing through the fluid supply line.

8. The liquid lithium delivery system of claim 7, wherein the filter assembly comprises a metal mesh filter operable to remove contaminants from the liquid lithium.

9. The liquid lithium delivery system of claim 1, wherein the one or more valves comprise a needle valve.

10. The liquid lithium delivery system of claim 9, wherein the one or more valves further comprise a regulator valve.

11. The liquid lithium delivery system of claim 1, further comprising:
a second fluid delivery line that fluidly couples the flow control region with a processing chamber; and
a filter assembly positioned along the second fluid delivery line operable to remove impurities from the liquid lithium flowing through the second fluid delivery line.

12. A liquid lithium delivery system, comprising:
a liquid lithium delivery module, comprising:
a lithium storage region operable to store liquid lithium, comprising:
a liquid lithium storage tank having an outlet port;
a pumping region operable to move the liquid lithium through the liquid lithium delivery module, comprising:
an electromagnetic pump operable to move the liquid lithium using electromagnetism; and
a flow control region operable to control a flow of the liquid lithium, comprising one or more valves operable to control the flow of the liquid lithium, wherein the pumping region is positioned downstream from the lithium storage region and upstream from the flow control region;
a fluid supply line fluidly coupling the outlet port of the liquid lithium storage tank with an inlet of the electromagnetic pump;
a flow control valve positioned along the fluid supply line and operable to control the flow of the liquid lithium from the liquid lithium storage tank through the fluid supply line and into the electromagnetic pump;
a fluid delivery line fluidly coupling an outlet of the electromagnetic pump with the one or more valves;
an electromagnetic flow meter positioned along the fluid delivery line and operable to monitor the flow of the liquid lithium through the electromagnetic pump and communicate with the flow control valve via a feedback loop; and
a feedback line positioned downstream from the electromagnetic flow meter and fluidly coupling the fluid delivery line with the fluid supply line, the feedback line operable to deliver the liquid lithium back to the fluid supply line; and
a liquid lithium resupply module detachably and fluidly coupled with the liquid lithium delivery module, comprising:
a liquid lithium resupply tank operable to supply liquid lithium to the liquid lithium delivery module; and
a first temperature control module, which is adapted to control a temperature of the liquid lithium resupply tank.

13. The liquid lithium delivery system of claim 12, wherein the first temperature control module comprises a heat exchanger, a resistive heater, a temperature control jacket, or a combination thereof.

14. The liquid lithium delivery system of claim 12, wherein the liquid lithium resupply tank comprises:
a canister having:
a sidewall;
a top surface; and
a bottom surface, wherein the sidewall, the top surface and the bottom surface define an interior volume;
an inlet port disposed through the top surface of the canister and operable to provide an inert gas to the interior volume of the canister; and
an outlet port disposed through the top surface of the canister and operable to allow the liquid lithium to flow out of the canister and into the liquid lithium delivery module.

15. The liquid lithium delivery system of claim 14, wherein the inlet port is fluidly coupled with an inert gas source.

16. A liquid lithium delivery system, comprising:
a liquid lithium delivery module, comprising:
a lithium storage region operable to store liquid lithium, comprising:
a liquid lithium storage tank having an outlet port;
a pumping region operable to move the liquid lithium through the liquid lithium delivery module, comprising:
an electromagnetic pump operable to move the liquid lithium using electromagnetism; and
a flow control region operable to control a flow of the liquid lithium, comprising one or more valves operable to control the flow of the liquid lithium, wherein the pumping region is positioned downstream from the lithium storage region and upstream from the flow control region;
a fluid supply line fluidly coupling the outlet port of the liquid lithium storage tank with an inlet of the electromagnetic pump;
a flow control valve positioned along the fluid supply line and operable to control the flow of the liquid lithium from the liquid lithium storage tank through the fluid supply line and into the electromagnetic pump;
a fluid delivery line fluidly coupling an outlet of the electromagnetic pump with the one or more valves;
an electromagnetic flow meter positioned along the fluid delivery line and operable to monitor the flow of the liquid lithium through the electromagnetic pump and communicate with the flow control valve via a feedback loop;
a feedback line positioned downstream from the electromagnetic flow meter and fluidly coupling the fluid delivery line with the fluid supply line, the feedback line operable to deliver the liquid lithium back to the fluid supply line; and
a liquid lithium resupply module detachably and fluidly coupled with the liquid lithium delivery module, comprising:
a liquid lithium resupply tank operable to supply the liquid lithium to the liquid lithium delivery module; and
a first temperature control module, which is adapted to control a temperature of the liquid lithium resupply tank;

a liquid lithium supply line that fluidly couples the liquid lithium resupply tank with the liquid lithium delivery module; and a filter assembly positioned along the liquid lithium supply line operable to remove impurities from the lithium liquid flowing through the liquid lithium supply line.

17. The liquid lithium delivery system of claim 16, wherein the filter assembly comprises a metal mesh filter operable to remove contaminants from the liquid lithium.

18. The liquid lithium delivery system of claim 16, wherein the lithium storage region further comprises:

a second temperature control module, which is operable to control the temperature of the liquid lithium storage tank.

19. The liquid lithium delivery system of claim 18, wherein the second temperature control module comprises a heat exchanger, a resistive heater, a temperature control jacket, or a combination thereof.

20. The liquid lithium delivery system of claim 18, wherein the liquid lithium storage tank comprises:

a canister having:
  a sidewall;
  a top surface; and
  a bottom surface, wherein the sidewall, the top surface and the bottom surface define an interior volume;

an inlet port disposed through the top surface of the canister and operable to provide an inert gas to the interior volume of the canister; and the outlet port disposed through the top surface of the canister and operable to allow liquid lithium to flow out of the canister.

* * * * *